United States Patent
Nagao et al.

[11] Patent Number: 5,892,354
[45] Date of Patent: Apr. 6, 1999

[54] VOLTAGE CONTROL APPARATUS AND METHOD FOR POWER SUPPLY

[75] Inventors: Yoshitaka Nagao, Ikoma; Kimitoshi Fukae, Nara; Nobuyoshi Takehara, Soraku-gun, all of Japan

[73] Assignee: Canon Kabushiki Kaisha, Tokyo, Japan

[21] Appl. No.: 717,330

[22] Filed: Sep. 20, 1996

[30] Foreign Application Priority Data

Sep. 22, 1995  [JP]  Japan .................................. 7-268008

[51] Int. Cl.$^6$ .............................. G05F 5/00; H02M 3/24
[52] U.S. Cl. .......................... 323/299; 323/906; 363/95
[58] Field of Search .............................. 363/95; 323/220, 323/299, 906

[56] References Cited

U.S. PATENT DOCUMENTS

| | | | |
|---|---|---|---|
| 4,468,569 | 8/1984 | Norris | 323/299 |
| 4,649,334 | 3/1987 | Nakajima | 323/299 |
| 5,001,415 | 3/1991 | Watkinson | 323/906 |
| 5,268,832 | 12/1993 | Kandatsu | 363/95 |
| 5,327,071 | 7/1994 | Frederick et al. | 323/299 |
| 5,438,505 | 8/1995 | Cohen | 363/95 |
| 5,493,155 | 2/1996 | Okamoto et al. | 323/906 |
| 5,548,504 | 8/1996 | Takehara | 363/65 |
| 5,604,430 | 2/1997 | Decker et al. | 323/906 |
| 5,621,300 | 4/1997 | Sato et al. | 320/5 |

FOREIGN PATENT DOCUMENTS

| | | |
|---|---|---|
| 62-85312 | 4/1987 | Japan . |
| 6-224962 | 8/1994 | Japan . |
| 6-348352 | 12/1994 | Japan . |

*Primary Examiner*—Stuart N. Hecker
*Attorney, Agent, or Firm*—Fitzpatrick, Cella, Harper & Scinto

[57] ABSTRACT

A voltage control apparatus which is robust against disturbances such as variations in solar radiation amount around a solar cell, and has quick response, has a voltage detection unit (4) for detecting the voltage value of a battery power supply (1), a power conversion unit (2) for performing predetermined conversion of electric power supplied from the battery power supply, and supplying the converted electric power to a load or a commercial AC system (3), an output setting unit (5) for setting the output value of the power conversion unit on the basis of the voltage detection value, and a control unit (6) for controlling the power conversion unit on the basis of the output setting value. The output setting unit is constituted by a target voltage setting unit (51) for setting the target voltage value of the battery power supply, and an output calculation unit (52) for calculating the output setting value on the basis of the deviation between the voltage detection value and the target voltage value.

21 Claims, 16 Drawing Sheets

VOLTAGE CONTROL APPARATUS AND METHOD FOR POWER SUPPLY

BACKGROUND OF THE INVENTION

The present invention relates to a voltage control apparatus and method for a power supply and, more particularly, to a voltage control apparatus and method for a power supply such as a solar cell.

In recent years, more people are showing growing interest in global environment and energy problems such as global warming, exhaustion of fossil fuels, radioactive pollutions caused by nuclear power plant failures and radioactive wastes, and the like. Under the circumstances, a solar cell is expected promising as an inexhaustible, clean energy source. However, since the output voltage of a solar cell or the like varies largely depending on the solar radiation amount, temperature, and operation voltage, it is required to adjust the load when viewed from the solar cell so as to always output maximum electric power. For this purpose, a method in which the optimum operation voltage of a solar cell is pre-set, and the actual operation voltage is determined to track the pre-set voltage has been proposed. Also, as disclosed in Japanese Patent Laid-Open No. 62-85312, a so-called hill-climbing method in which the operation voltage or current of a solar cell is varied slightly, and variations in electric power at that time are checked to determine an operation voltage, has also been proposed.

However, as exemplified in FIG. 1, the operation voltage of the solar cell responds quickly to variations in solar radiation amount, and when the solar radiation amount abruptly varies, a voltage control apparatus that uses a conventional feedback control system constituted by a comparator, an integrator, and the like cannot often track the optimum operation voltage. In order to suppress the influence of abrupt variations in solar radiation amount, adjustment for setting, e.g., relatively large parameters such as a proportional gain is performed, or a differentiator is added. However, in this case, the influence of noise may become serious, and so the operation may become unstable.

When optimum operation point tracking control is performed, the operation voltage or current of a solar cell is varied slightly, and variations in electric power at that time are checked. At this time, a wrong operation voltage command may be issued unless a constant operation voltage is set, resulting in operation errors.

SUMMARY OF THE INVENTION

The present invention has been made in consideration of the conventional problems, and has as its object to provide a voltage control apparatus and method, which are strong against disturbances to the influence of which a solar cell is susceptible, such as variations in solar radiation amount, and have quick response.

It is another object of the present invention to provide a voltage control apparatus comprising voltage detection means for detecting a voltage value of a battery power supply, power conversion means for performing predetermined conversion of electric power supplied from the battery power supply, and supplying the converted electric power to a load or a commercial AC system, output setting means for setting an output value of the power conversion means on the basis of the voltage detection value, and control means for controlling the power conversion means on the basis of the output setting value, wherein the output setting means comprises target voltage setting means for setting a target voltage value of the battery power supply, and output calculation means for calculating the output setting value on the basis of a deviation between the voltage detection value and the target voltage value.

Note that the output setting means may comprise proportional adjustment means for adjusting the output setting value in proportion to the m-th power of the deviation, and integral adjustment means for adjusting the output setting value in proportion to an integral value of the m-th power of the deviation.

The output setting means may comprise derivative adjustment means for adjusting the output setting value in proportion to a differential value of the n-th power of the deviation.

It is still another object of the present invention to provide a battery power supply voltage control method for controlling a voltage of a battery power supply in an apparatus which comprises the battery power supply, and power conversion means for performing predetermined conversion of electric power supplied from the battery power supply, and supplying the converted electric power to a load or a commercial AC system, and controls the power conversion means on the basis of a voltage value of the battery power supply, comprising the steps of: sampling a voltage value of the battery power supply; setting a target voltage value of the battery power supply; calculating a deviation between the sampled voltage value and the set target voltage value; calculating a proportional term proportional to the m-th power of the deviation; calculating an integral term proportional to an integral value of the m-th power of the deviation; calculating a derivative term proportional to a differential value of the n-th power of the deviation; calculating an output setting value of the power conversion means on the basis of a sum of the proportional, integral, and derivative terms; and controlling a voltage of the battery power supply by controlling the power conversion means in accordance with the output setting value.

It is still another object of the present invention to provide a battery power supply voltage control method for controlling a voltage of a battery power supply in an apparatus which comprises the battery power supply, and power conversion means for performing predetermined conversion of electric power supplied from the battery power supply, and supplying the converted electric power to a load or a commercial AC system, and controls the power conversion means on the basis of a voltage value of the battery power supply, comprising the steps of: sampling a voltage value of the battery power supply; setting a target voltage value of the battery power supply; calculating a deviation between the sampled voltage value and the set target voltage value; calculating a change amount of an output setting value of the power conversion means on the basis of m-th power values and n-th power values of k deviations; calculating a current output setting value of the power conversion means by adding a previous output setting value of the power conversion means and the change amount of the output setting value; and controlling a voltage of the battery power supply by controlling the power conversion means in accordance with the calculated current output setting value.

At this time, k is preferably set to be at least 3.

The three deviations are preferably calculated from three successively sampled voltage values.

Also, n is preferably set to be 2, and m is preferably set to be 1 or 2.

The battery power supply of such voltage control apparatus preferably comprises a solar cell, and the solar cell preferably comprises an amorphous solar cell.

According to the present invention, voltage variations are suppressed by modifying the estimation process of errors caused by changes in voltage as a result of the influence of disturbances such as variations in solar radiation amount, changes in use condition of the load, and the like. FIG. 2 shows an example of the battery power supply voltage and the output command value (output setting value). As shown in FIG. 2, since the influence of abrupt changes in voltage due to the influence of variations in solar radiation amount or the like is estimated with a large weight by calculating the m- or n-th power of a deviation, and small changes in voltage due to, e.g., noise are estimated with a small weight by calculating the m- or n-th power of a deviation, stable constant voltage control can be realized.

Since the output setting means performs differential control based on the n-th power of an error in addition to proportional-integral control, which is popularly used in the conventional apparatus, a future change amount can be predicted based on the change amount at the sampling time, thus improving tracking performance. Especially, since digital control that processes discrete data suffers a time lag upon sampling or control, this prediction function is effective.

Furthermore, the estimation based on the square of a deviation can be realized by high-speed calculations using current high-speed CPUs.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 3:
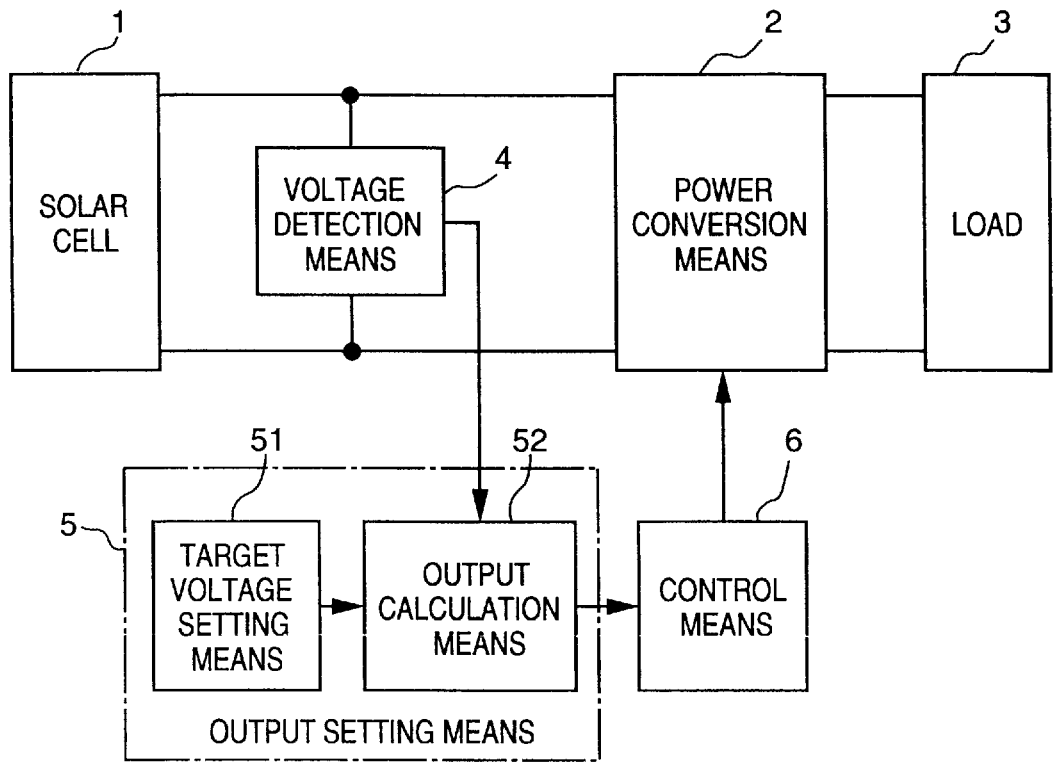
FIGS. 3, 4, 10, and 15 are schematic block diagrams showing the arrangements of a solar power generation system to which the voltage control technique of the present invention can be applied.

FIG. 3 shows one preferred arrangement of a solar power generation system to which a voltage control apparatus according to the present invention is applied.

Referring to FIG. 3, reference numeral 1 denotes a solar cell serving as a power supply; 2, a power conversion means; 3, a load; 4, a voltage detection means; 5, an output setting means; 6, a control means; 51, a target voltage setting means; and 52, an output calculation means.

As shown in FIG. 3, DC electric power output from the solar cell 1 serving as a battery power supply is converted by the power conversion means 2, and the converted electric power is supplied to the load 3.

As the battery power supply 1, a solar cell using amorphous silicon such as an amorphous silicon-based material, monocrystalline silicon, polycrystalline silicon, or a compound semiconductor is preferably used. Normally, a plurality of solar cells are combined in series or parallel with each other to constitute a solar cell array or string, so as to obtain a required voltage or current.

As the power conversion means 2, a DC/DC converter, a self-excited voltage type DC/AC converter, or the like using a power transistor, a power MOSFET, an IGBT (Insulated Gate Bipolar Transistor), a GTO (Gate Turn-OFF thyristor), or the like is preferably used. The voltage conversion means 2 can control the power flow, input/output voltages, output frequency, and the like by changing the ON/OFF duty ratio of gate pulses.

As the load 3, an electrothermal load, a motor load, a commercial AC system, a combination of them, and the like are available. When the load 3 is a commercial AC system, it is called a system-interconnected solar power generation system, and electric power that can be input to a system is not limited. Hence, a larger amount of electric power can be output from the battery power supply.

The voltage detection means 4 voltage-divides the output voltage from the battery power supply 1 with a resistor, and supplies the obtained voltage value signal to the output setting means 5 as a detection signal. In this case, in order to avoid, e.g., noise mixing, the transmission circuit of the detection signal is preferably insulated from the output circuit of the battery power supply 1 using, e.g., a photocoupler that can perfectly insulate the input and output circuits from each other. When the output setting means 5 comprises a digital circuit, the voltage value signal is A/D-converted into a digital value, which is supplied to the output setting means 5.

The target voltage setting means 51 sets the output voltage of the solar cell 1. The output calculation means 52 determines an output voltage setting value on the basis of the deviation between the solar cell output voltage indicated by the detection signal and the target voltage set by the target voltage setting means 51, and supplies the determined value to the control means 6.

The output setting means 5 may be realized using an analog circuit. However, the output setting means 5 is preferably realized by a digital circuit 5, and its calculation processing is preferably attained in a software manner, since parameters can be easily changed. In this case, the output setting means 5 can be constituted by, e.g., a control microcomputer that comprises, e.g., a CPU, a PAM, a ROM, input/output ports, a numeric value calculator, and the like.

The control means 6 of the power conversion means is, for example, a so-called gate drive circuit, and generates gate pulses by the instantaneous value current comparison method, the sine wave/triangular wave comparison method, or the like. With these pulses, the current flow rate or the like of the power conversion means 2 is controlled, so that the output voltage from the solar cell 1 matches the output from the output setting means 5 for the battery power supply. The control means 6 can be constituted by either an analog circuit or a digital circuit, but is normally constituted by a digital circuit to attain processing in a software manner by arranging a CPU, a DSP, and the like, since parameters, and the like can be easily changed.

The control means 6, which is constituted by a digital circuit to attain processing in a software manner, has an arrangement similar to that of the above-mentioned output setting means 5. In this case, a common arrangement may be used for the output setting means 5 and the control means 6.

[First Embodiment]

(m=1, n=2, Constant Voltage Control)

Figure 4:
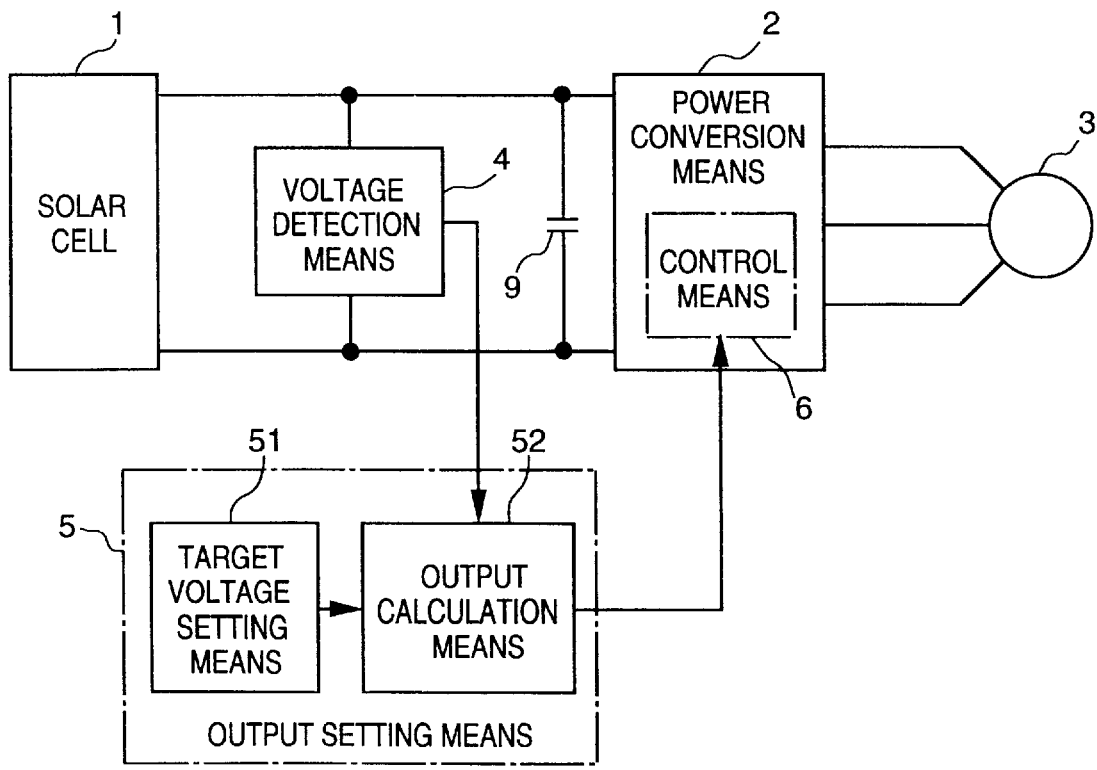

FIG. 4 is a schematic block diagram showing an example of the arrangement of a solar power generation system according to the first embodiment of the present invention.

This embodiment exemplifies a case wherein the output setting means 5 comprises a proportional adjustment means for adjusting the power conversion means 2 in proportion to the m-th power of the deviation between the solar cell output voltage and the target voltage, an integral adjustment means for adjusting the power conversion means 2 in proportion to the integral value of the m-th power of the deviation, and a derivative adjustment means for adjusting the power conversion means 2 in proportion to the differential value of the n-th power of the deviation, these multipliers m and n are respectively 1 and 2, and constant voltage control is to be performed.

This embodiment relates to a solar pump system. In this system, 20 amorphous silicon solar cell modules (available from USSC Corp., trade name: MBC-131) are connected in series with each other as the solar cell 1, the series circuit of the solar cell modules is connected to an AC three-phase motor direct-coupled magnet pump (available from SANSO ELECTRIC CO. LTD., trade name: PMD-613B2M) via a versatile inverter (available from Mitsubishi Electric Corp., trade name: FREQROL-U100) serving as the power conversion means 2 and its control means 6, and an aluminum electrolytic capacitor (capacitance: 1,000 $\mu$F) is inserted as a capacitor 9 between the versatile inverter and the solar cell 1.

The voltage detection means 4 has the following arrangement. That is, the voltage detection means 4 voltage-divides the output voltage from the solar cell module to 100:1 by resistors, and outputs a voltage signal to the A/D conversion port of a 5 V full-scale, 12-bit A/D D/A conversion, parallel input/output board (available from Adotec System Science, trade name: AB98-57B) inserted in an expansion slot of a personal computer (available from NEC Corp., trade name: PC-9801DA).

As the output setting means 5, this personal computer is used, and the calculation result of a software program installed in advance in the personal computer is output as a frequency setting signal from the D/A conversion terminal of the above-mentioned A/D D/A conversion, parallel input/output board to the control means 6 of the versatile inverter. In order to start, stop, or reset the pump and the inverter, a start, stop, or reset signal is supplied from the parallel output terminal of this board to the control means of the versatile inverter.

As an input device of the target voltage in the target voltage setting means 51, an input device (e.g., a keyboard) of this personal computer is used.

The output voltage setting method of this embodiment will be described below.

The solar cell module is equipped outdoors, and the target voltage of the target voltage setting means 51 is set to be 270 [V] to control the operation voltage of the solar cell 1 to 270 [V].

As an output setting algorithm, a PID (proportional-integral-derivative) control algorithm is adopted. This algorithm sets a manipulated variable by calculating the proportional, integral, and differential values of the deviation between the target voltage and the solar cell output voltage. In this case, the manipulated variable is the output frequency of the inverter. This PID control algorithm is given by equation (1) below:

$$MV = K_P \left( e + \frac{1}{T_I} \int e\, dt + T_D \frac{de}{dt} \right) + MV_0 \qquad (1)$$

MV: manipulated variable e: deviation (=target voltage−solar cell output voltage)

$K_P$: proportional gain $T_I$: integral time $T_D$: differential time $MV_0$: initial value of manipulated variable In this embodiment, since the processing is performed by the personal computer, the difference between the current and previous manipulated variables is calculated, and equation (1) above is approximated by equation (2) below:

$$MV = MV_{n-1} + K_P \left\{ (e_n - e_{n-1}) + \frac{\Delta t}{T_I} e_n + \frac{T_D}{\Delta t} (e_n - 2e_{n-1} + e_{n-2}) \right\} \qquad (2)$$

MV: current manipulated variable $MV_{n-1}$: previous manipulated variable $e_n$: current deviation $e_{n-1}$: previous deviation $e_{n-2}$: second next-to-last deviation $\Delta t$: sampling interval In this embodiment, the square of the deviation is estimated. That is, estimation is performed using equation (3) below:

$$e' = k|e|e \qquad (3)$$

In this embodiment, the square of the deviation is applied to only the derivative term. At this time, equation (2) is rewritten as equation (4) below:

$$MV_n = MV_{n-1} + K_P \left\{ (e_n - e_{n-1}) + \frac{\Delta t}{T_I} e_n + \frac{T_D'}{\Delta t} (e_n|e_n| - 2e_{n-1}|e_{n-1}| + e_{n-2}|e_{n-2}|) \right\} \qquad (4)$$

A large number of methods of determining parameters have been proposed. For example, a method of calculating parameters on the basis of the time response waveform obtained when the manipulated variable is changed stepwise, a method of calculating parameters on the basis of the transfer function with respect to the manipulated variable, and the like are known. However, with these methods, optimum values cannot be obtained, and the parameters calculated by these methods must be finely adjusted. In this system, the parameters are adjusted to $\Delta t=0.2$, $K_P=-0.20$, $T_I$, $=0.18$, and $T_D'0.08$.

For example, when the actual voltage, maintained at 270.0 [V], from the solar cell deviates to 270.2 [V], the voltage has risen 0.2 [V] above the target voltage. For this reason, the voltage must be lowered by increasing the output frequency of the inverter. The frequency increment at that time is calculated to be +0.09 [Hz] by estimating the deviation "−0.2 [V]" using its square, i.e., "−0.04 [V]".

Assume that the solar radiation amount falls abruptly due to, e.g., cloudiness, the currently set frequency causes an overload state, and the voltage drops abruptly to 268.0 [V]. The frequency increment at that time is calculated to be −1.16 [Hz] by estimating this deviation "2.0 [V]" using its square, i.e., "4 [V]".

Figure 5:
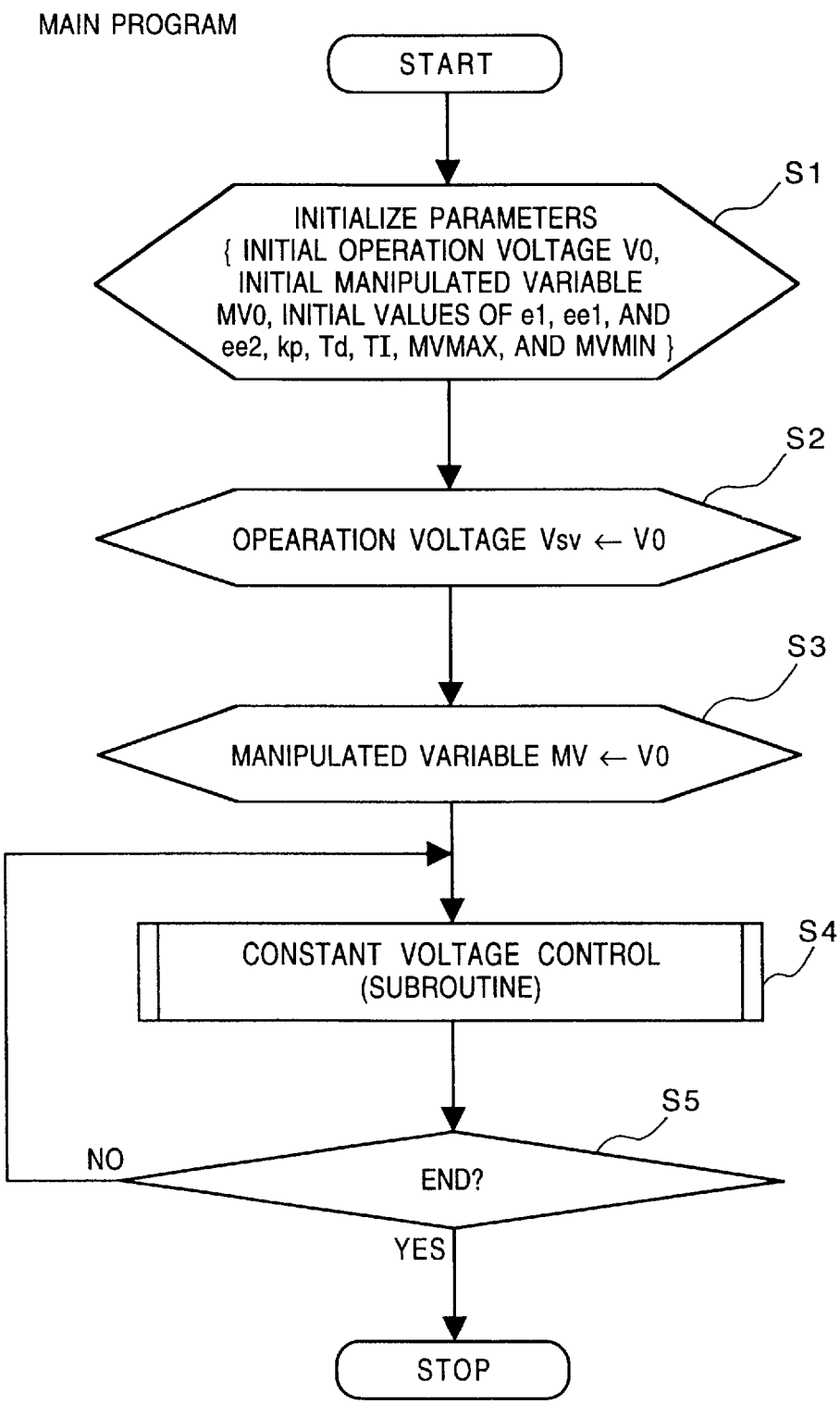
FIGS. 5, 6, 12, 13, 17, and 18 are schematic flow charts for explaining examples of voltage control according to the present invention.
Figure 6:
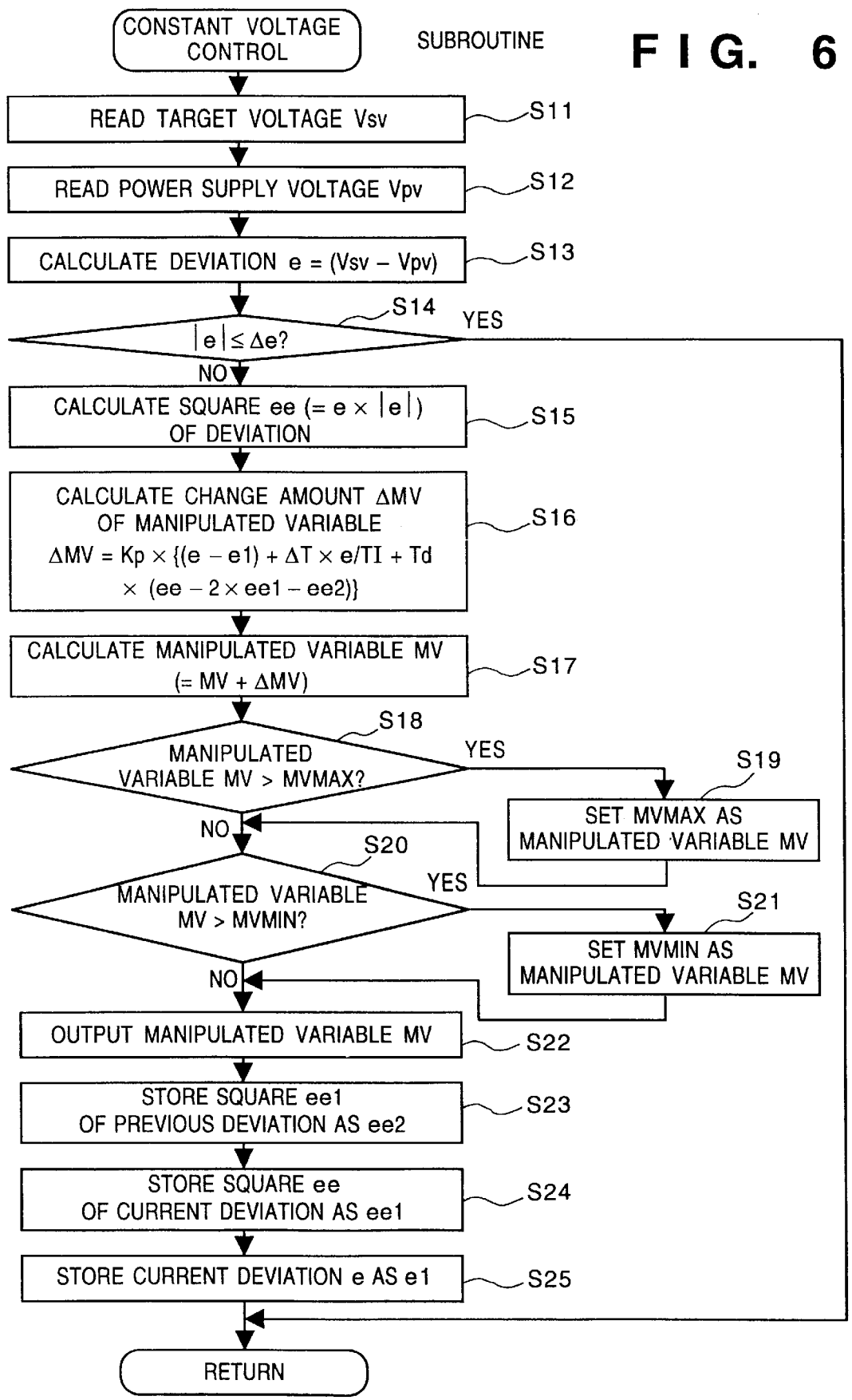

FIGS. 5 and 6 are flow charts showing an example of the constant voltage control that adopts the above-mentioned algorithm. FIG. 5 shows the main program, and FIG. 6 shows the subroutine. When the control is started, the respective parameters are initialized in step S1. In steps S2 and S3, the operation voltage and the manipulated variable are set to be predetermined values. In step S4, the constant voltage control is performed. If the constant voltage control in step S4 is completed, the flow ends; otherwise, the flow returns to step S4 to perform the constant voltage control again.

In the constant voltage control routine (S4) shown in FIG. 6, a target voltage Vsv and a power supply voltage Vpv are read in steps S11 and S12. In step S13, a deviation e is calculated using the voltage values read in steps S11 and S12. In step S14, it is checked if the deviation e calculated in step S13 falls within the constant voltage precision range of +Δe (Δe≧0). If YES in step S14, the constant voltage control ends, and the flow returns to the main program; otherwise, the square, ee, of the deviation e is calculated (step S15). In step S16, the change amount of the manipulated variable is calculated on the basis of the calculated deviation and predetermined parameters. Note that the calculation formula used in step S16 is a modified one of equation (4), and e1, ΔT, TI, Td, ee1, ee2, and ΔMV respectively correspond to $e_{n-1}$,/ Δt, $T_I$, $T_D$', $e_{n-1}|e_{n-1}|$, $e_{n-2}|e_{n-2}|$, and $MV_n - MV_{n-1}$. In step S17, a current manipulated variable MV is calculated based on the previous manipulated variable and the change amount. In step S18, it is checked if the current manipulated variable MV is larger than a maximum manipulated variable MVMAX. If YES in step S18, the maximum manipulated variable MVMAX is set to be the current manipulated variable MV (step S19). On the other hand, if NO in step S18, it is checked in step S20 if the current manipulated variable MV is larger than a minimum manipulated variable MVMIN. If YES in step S20, the minimum manipulated variable MVMIN is set to be the current manipulated variable MV (step S21). On the other hand, if NO in step S20, the calculated in variable MV calculated in step S17 is output in step S22. In step S23, the square ee1 of the previous deviation is stored as ee2. In step S24, the square ee of the current deviation is stored as ee1. In step S25, the current deviation e is stored as e1. Thereafter, the flow returns to the main program.

Figure 1:
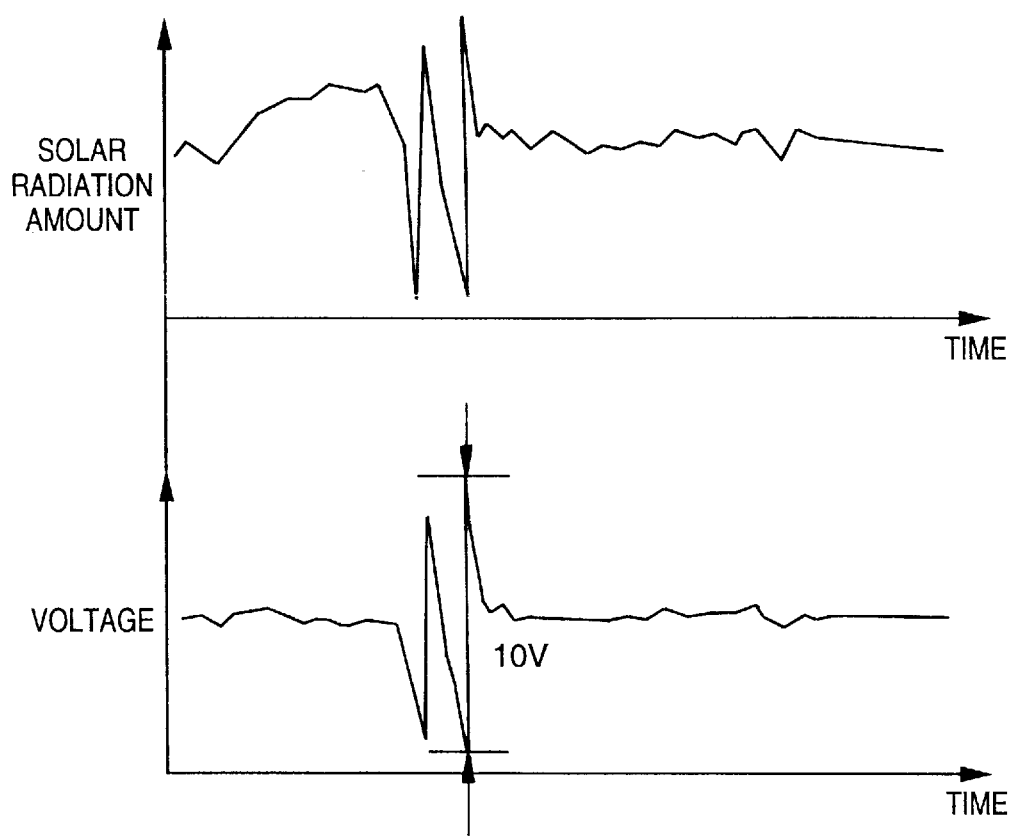
FIG. 1 is a graph for explaining an example of changes in solar cell voltage upon variations in solar radiation amount when PI (proportional-integral) control is performed.
Figure 2:
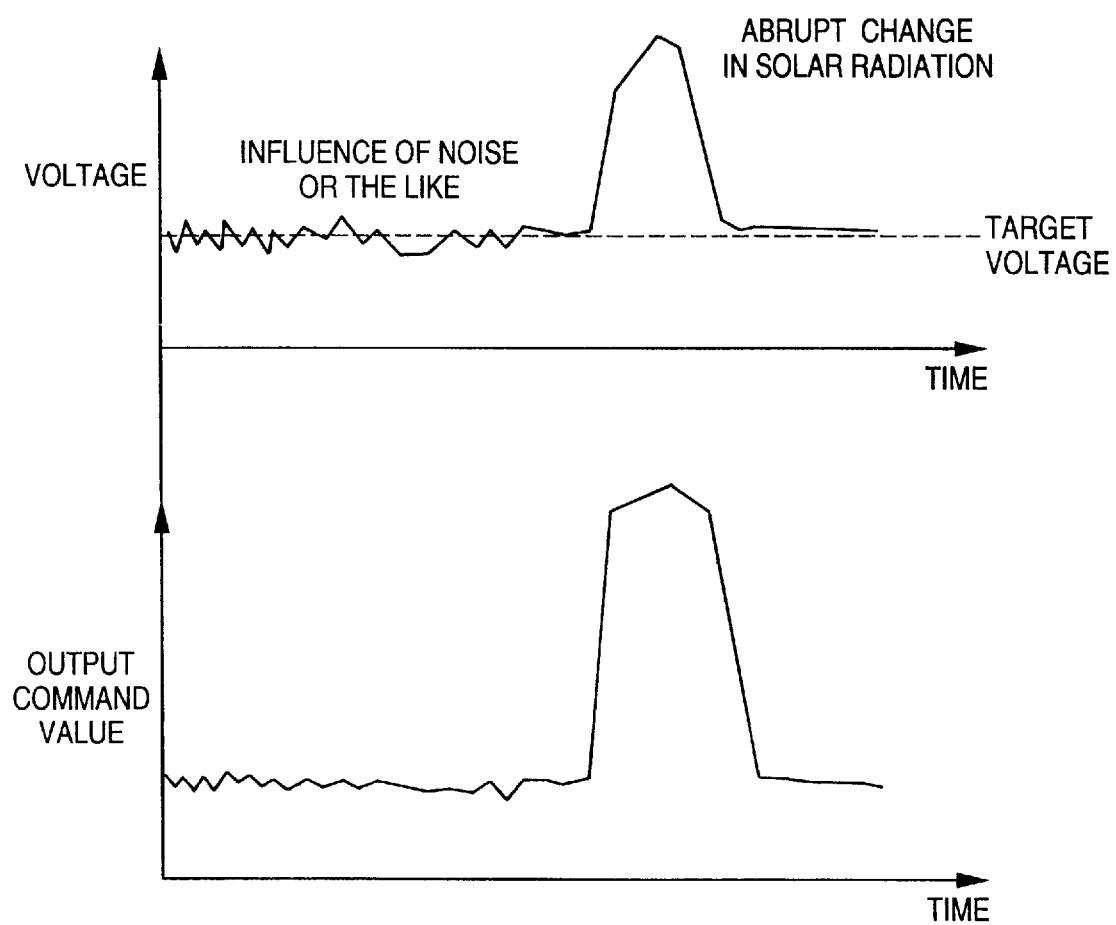
FIG. 2 is a graph showing an example of the relationship between the battery power supply voltage and the output command value in the present invention.
Figure 7:
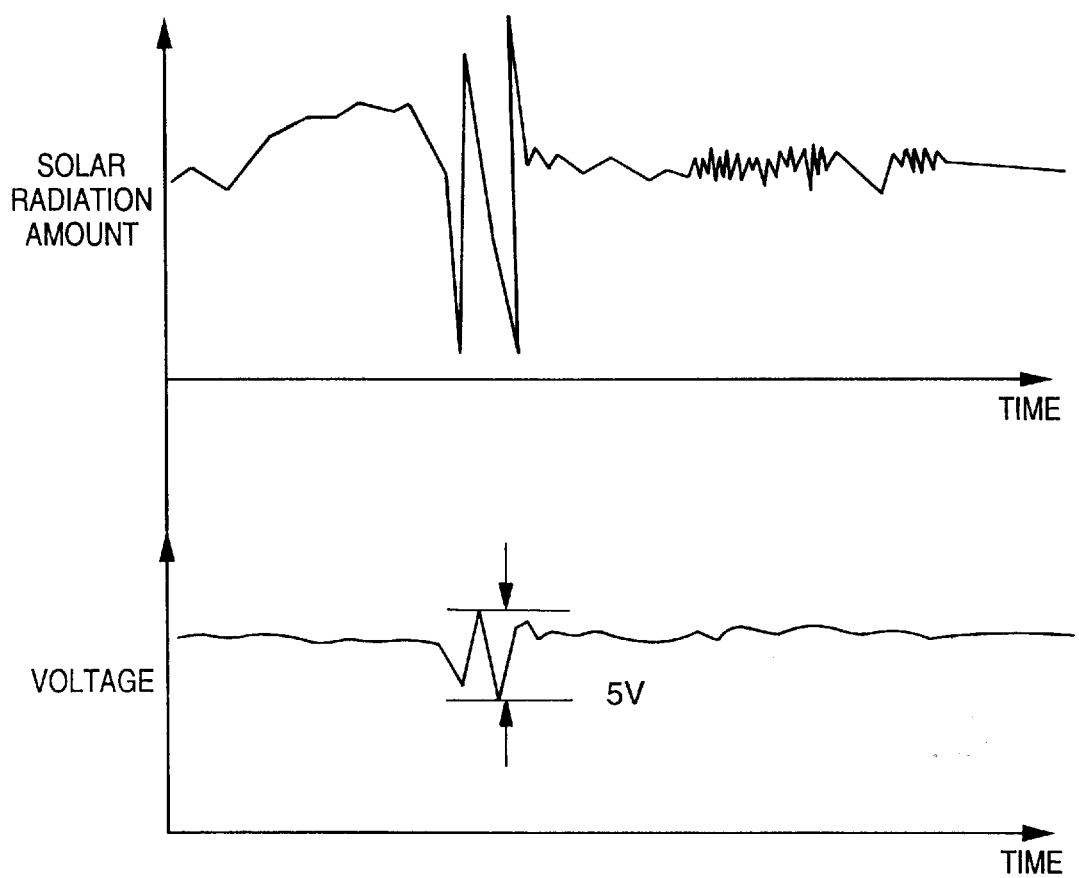
FIGS. 7 and 8 are graphs for explaining examples of the relationship between variations in solar radiation amount and changes in voltage.
Figure 8:
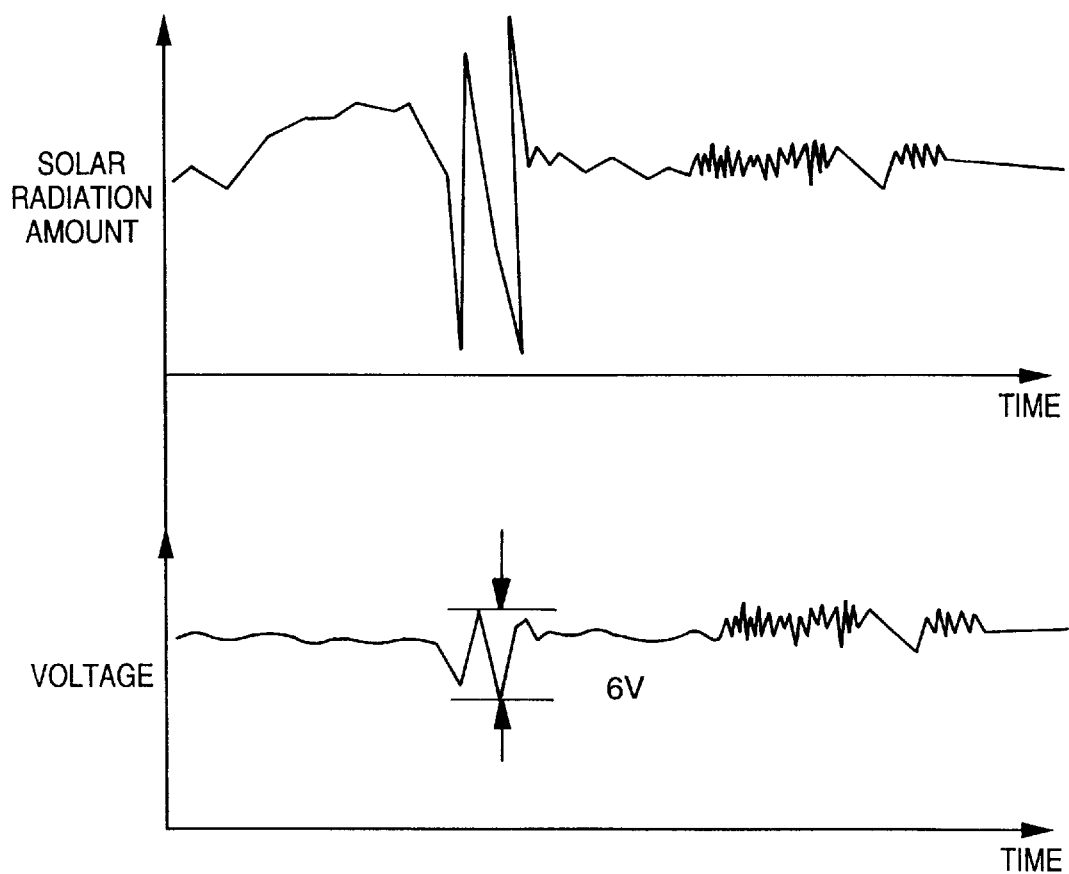

FIG. 7 shows an example of the operation result of the solar pump system of this embodiment in the above-mentioned procedure. As can be seen from FIG. 7, the output voltage is nearly constant, and can be controlled within the range of ±5 [V] even when the solar radiation amount has changed abruptly. As compared to the result shown in FIG. 1 obtained by controlling this system by PI (proportional-integral) control which is popularly used in the conventional apparatus, variations in voltage upon abrupt changes in solar radiation amount (e.g., from 30 [mW/cm²] to 80 [mW/cm²]) can be improved to ½. As compared to the result of PID control (m=1, n=1) shown in FIG. 8, small variations due to the influence of noise can be eliminated in this embodiment.

Figure 9:
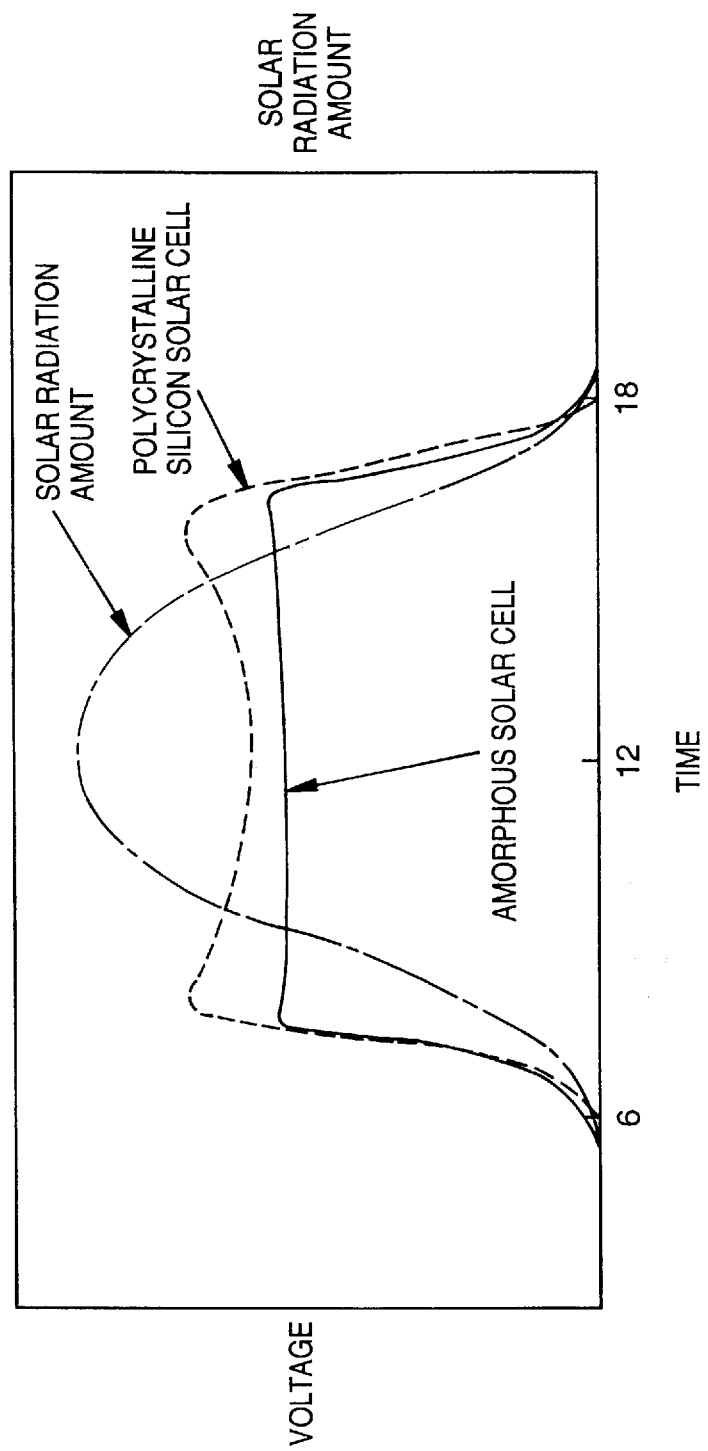
FIG. 9 is a graph showing an example of 24-hour changes in optimum operation voltages of an amorphous solar cell and a crystalline silicon solar cell.

FIG. 9 shows 24-hour changes in optimum operation voltage of an amorphous solar cell and a crystalline solar cell (a polycrystalline silicon solar cell in this case). As shown in FIG. 9, even when the solar radiation amount or temperature varies, the optimum operation voltage of the amorphous solar cell does not vary largely as compared to that of the polycrystalline silicon solar cell. Hence, the constant voltage control is very effective for the amorphous solar cell.

[Second Embodiment]
(m=1, n=2, change target voltage)

The second embodiment wherein the target voltage is changed in addition to the control in the first embodiment will be explained below.

Figure 10:
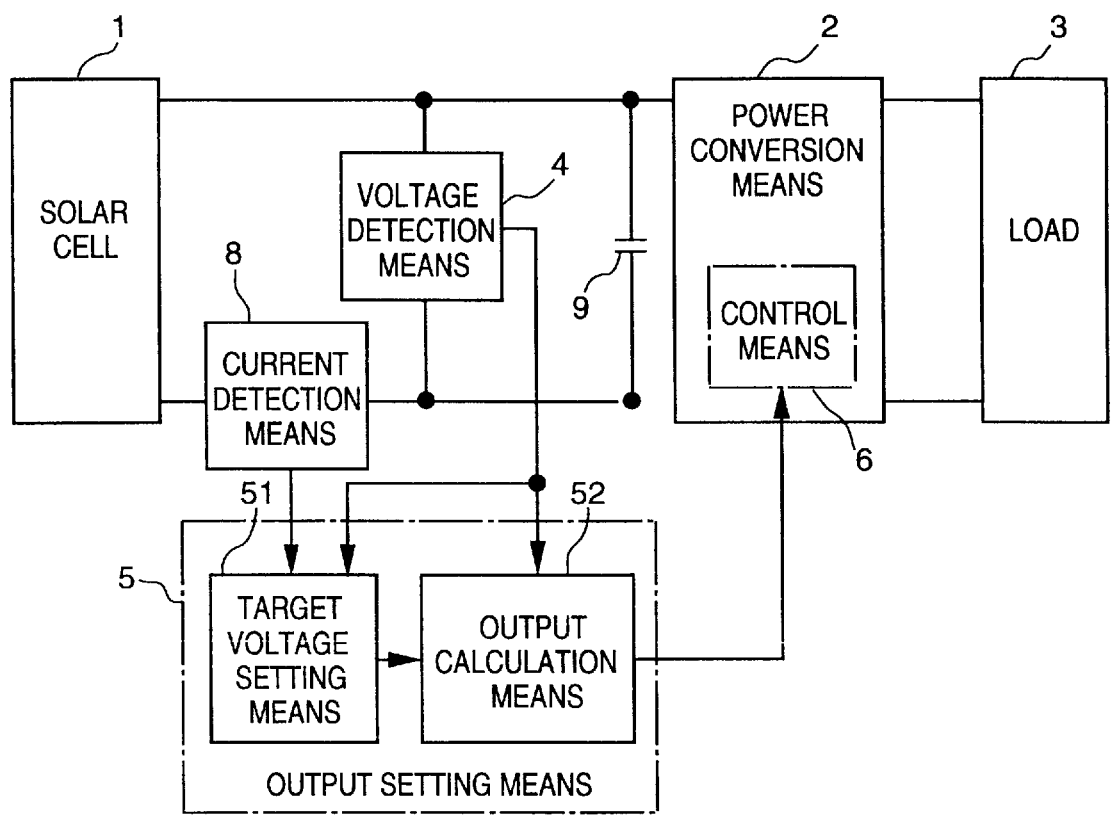

As shown in FIG. 10, this embodiment constitutes the solar cell 1, the power conversion means 2 and its control means 6, and the AC three-phase motor direct-coupled magnet pump as the load 3 in the same manner as in the first embodiment described above, and a current detection means 8 is inserted in series with the solar cell array circuit. The target voltage setting means 51 performs a maximum output tracking control function of the solar cell 1 in a software manner. As the output setting means 5, a one-board microcomputer (8086 available from Intel Corp.) is used.

In this arrangement, the maximum output point tracking control (MPPT control: Max Power Point Tracking control) of the solar cell 1 is performed using the voltage control method of the present invention. The solar cell array 1 is equipped outdoors, and the output from the output setting means 5 is set to be 250 [V]. At this time, the array output from the solar cell 1 is assumed to be a voltage of 250 [V], a current of 0.27 [A], and electric power of 131 [W], and the solar radiation amount is assumed to be about 75 mW/cm². These initial values can be arbitrarily selected depending on the array arrangement of the solar cell 1 that matches the input/output voltage of the power conversion means 2, and the type of solar cell 1 used.

The output setting means 5 sets a frequency to be output to the inverter serving as the control means 6. As a PID control formula used for setting the magnitude of this sine waveform, equation (1) above is used. A deviation is estimated as in equation (3) above, the square of the deviation is applied to only the derivative term as in the first embodiment, and equation (4) above is used.

Note that the respective parameters are set to be Δt=0.2, $K_P$=−0.30, $T_I$=0.18, and $T_D$=0.08.

Figure 11:
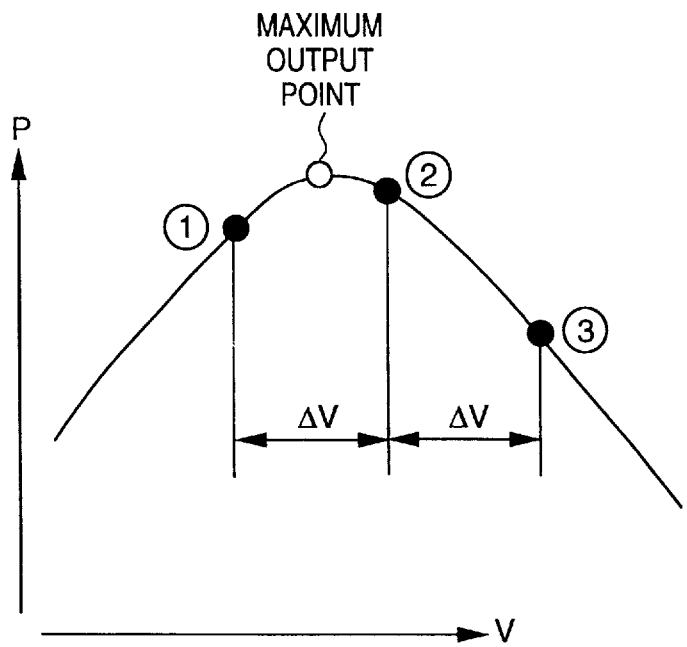
FIGS. 11 and 16 are graphs showing examples of the optimum operation point search operation.

Subsequently, the target voltage setting means 51 changes the output voltage from the solar cell 1 from 260 [V] to 270 [V] at three points separated by 5-V intervals, as shown in FIG. 11. Note that ① in FIG. 11 indicates 260 [V], ② indicates 265 [V], and ③ indicates 270 [V].

Figure 12:
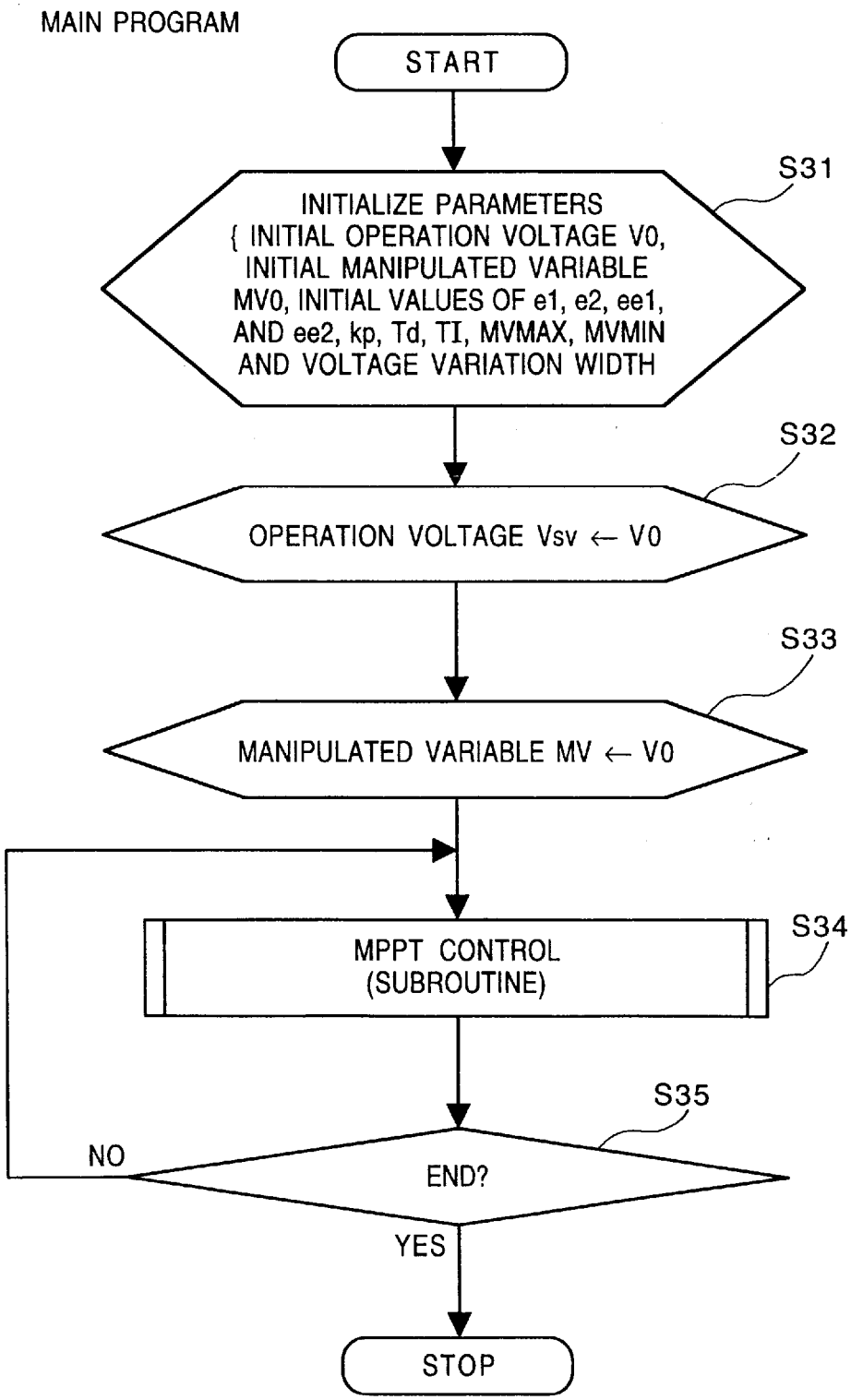
Figure 13:
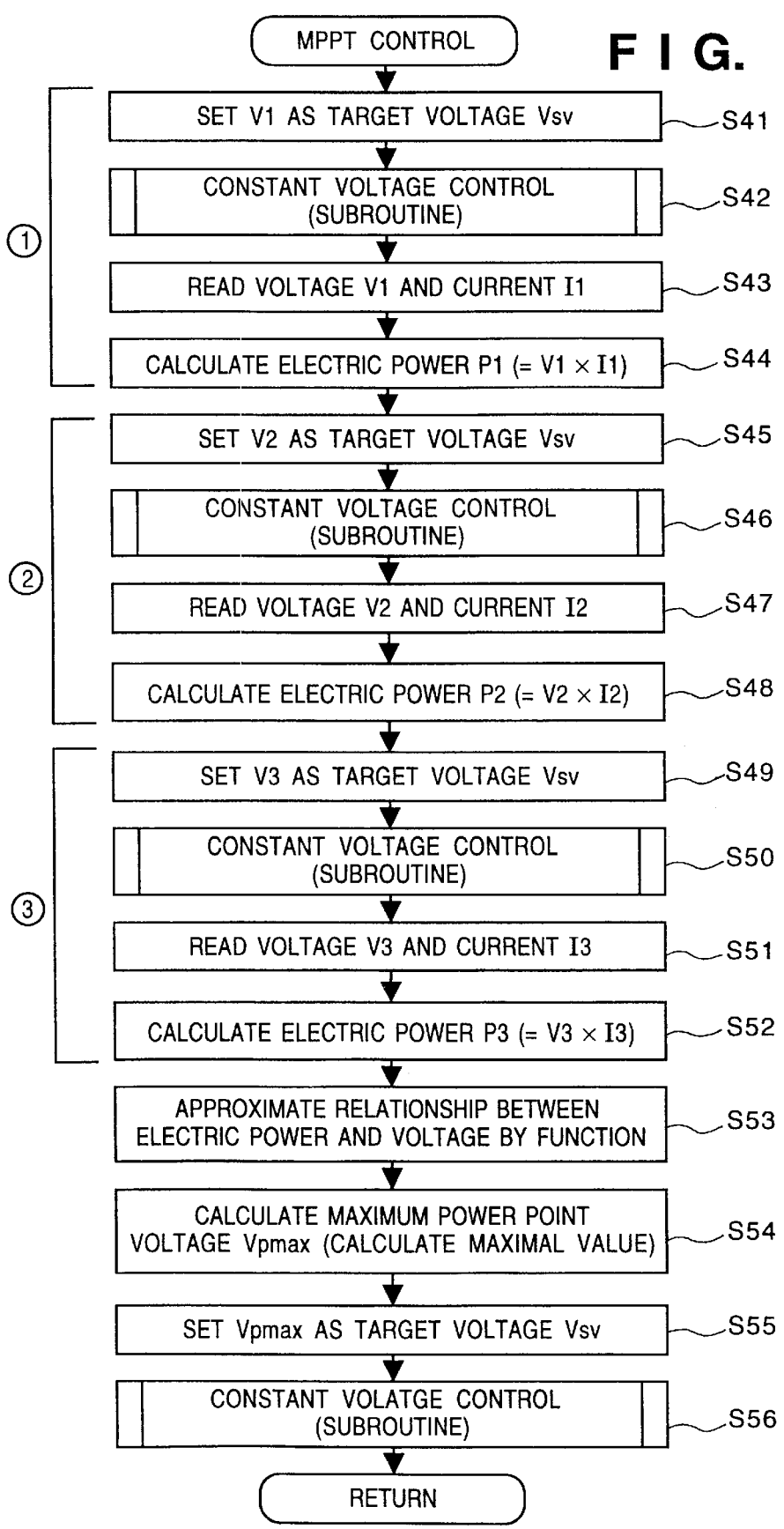

These set voltages, and currents and electric powers obtained in correspondence with these voltages are stored in a memory of the one-board microcomputer, and are approximated by a quadratic curve to obtain a maximum point of the curve. FIGS. 6, 12, and 13 are flow charts showing the procedure of these operations. When the control is started, the parameters are initialized in step S31. In steps S32 and S33, the operation voltage and the manipulated variable are set to be predetermined values. In step S34, the MPPT control is performed. If the MPPT control is completed, the control operation ends; otherwise, the flow returns to step S34 to perform the MPPT control.

FIG. 13 shows the flow of the MPPT control routine (S34). In the MPPT control routine, output voltages P1 to P3 of the solar cell 1 are obtained in association with ① to (I in FIG. 13. The processing for ① will be described below. In step S41, the target voltage is set to be V1 (=260 [V]). In step S42, the constant voltage control routine shown in FIG. 6 is executed. In step S43, the target voltage setting means 51 reads a voltage value V1 and a current value I1 from the voltage detection means 4 and the current detection means 8, respectively. In step S44, electric power P1 associated with ① is calculated on the basis of the voltage value V1 and the current value I1 read in step S43. In this way, electric powers P2 and P3 associated with ① and ② are also calculated (steps S45 to S52). Subsequently, in step S53, the relationship between the output electric power and the output voltage from the solar cell 1 is approximated by a function. In step S54, a voltage value Vpmax at a maximum power point obtained from the function approximation formula is calculated. In step S55, the voltage value calculated in step S54 is set to be the target voltage, and the constant voltage control routine is executed again (step S56). Thereafter, the flow returns to the main program.

TABLE 1

|  | Current [A] | Electric Power [W] |
| --- | --- | --- |
| ① 260 V | 0.266 | 69.1 |
| ② 265 V | 0.262 | 69.3 |
| ③ 270 V | 0.255 | 68.8 |

Figure 14:
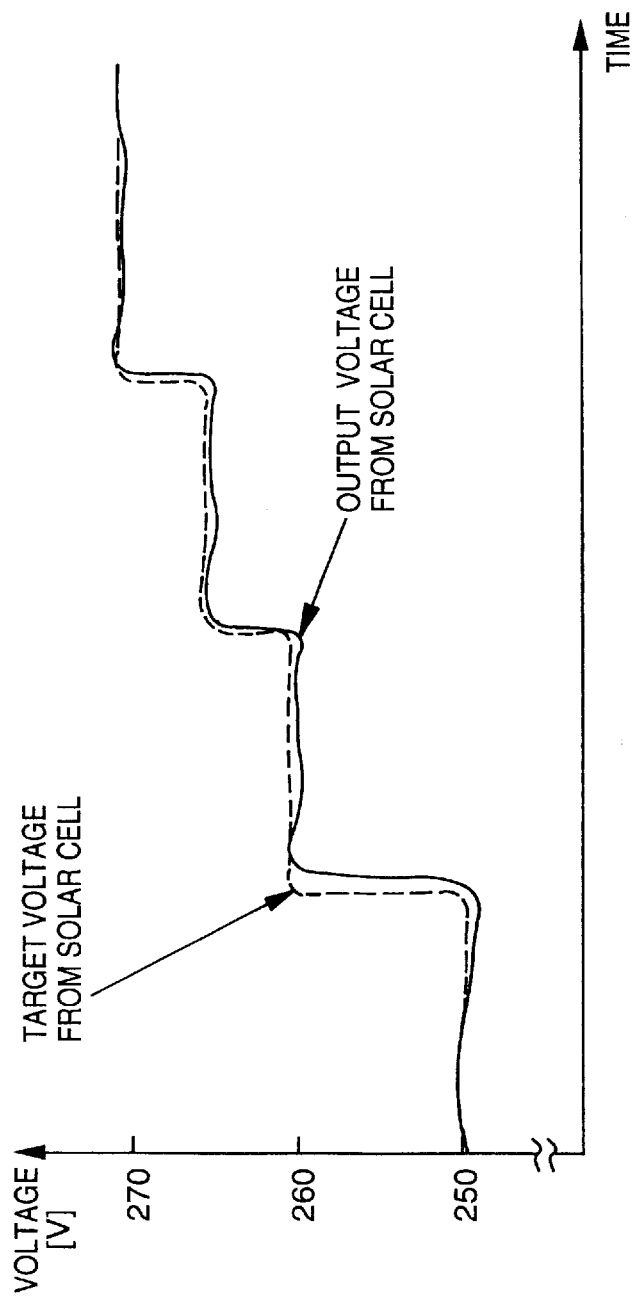
FIGS. 14 and 19 are graphs showing examples of the voltage followability.

In this embodiment, as a result of changing the solar cell output voltage from 260 [V] to 270 [V] at three points separated by 5-V intervals, the results shown in Table 1 above are obtained. From the function approximation formula obtained from these results, the voltage at the maximum output point is calculated to be V=263.9 [V]. In this manner, the target voltage command value is determined, and is output to the control means 6. FIG. 14 shows changes in output voltage from the solar cell 1 at that time. As can be seen from FIG. 14, since an optimum operation voltage measured by an I–V tracer immediately before confirmation of the operation of this embodiment is about 264.0 [V], an operation at an optimum operation voltage is confirmed.

In the above description, the deviation is estimated using its square, but may be estimated using the power of a higher order. In the latter case, the parameters of the PID control formula, the determination method of the parameters, and the like must be modified. Note that the above-mentioned calculations are performed by the one-board microcomputer that constitutes the output setting means 5. As a matter of course, the operation sequence and the relation between the voltage and current are pre-set in the memory of the one-board microcomputer as a program.

[Third Embodiment]
(m=2, n=2, change target voltage)

The third embodiment wherein the multipliers m and n in the first embodiment are respectively set to be 2, and the target voltage is changed will be explained below.

Figure 15:
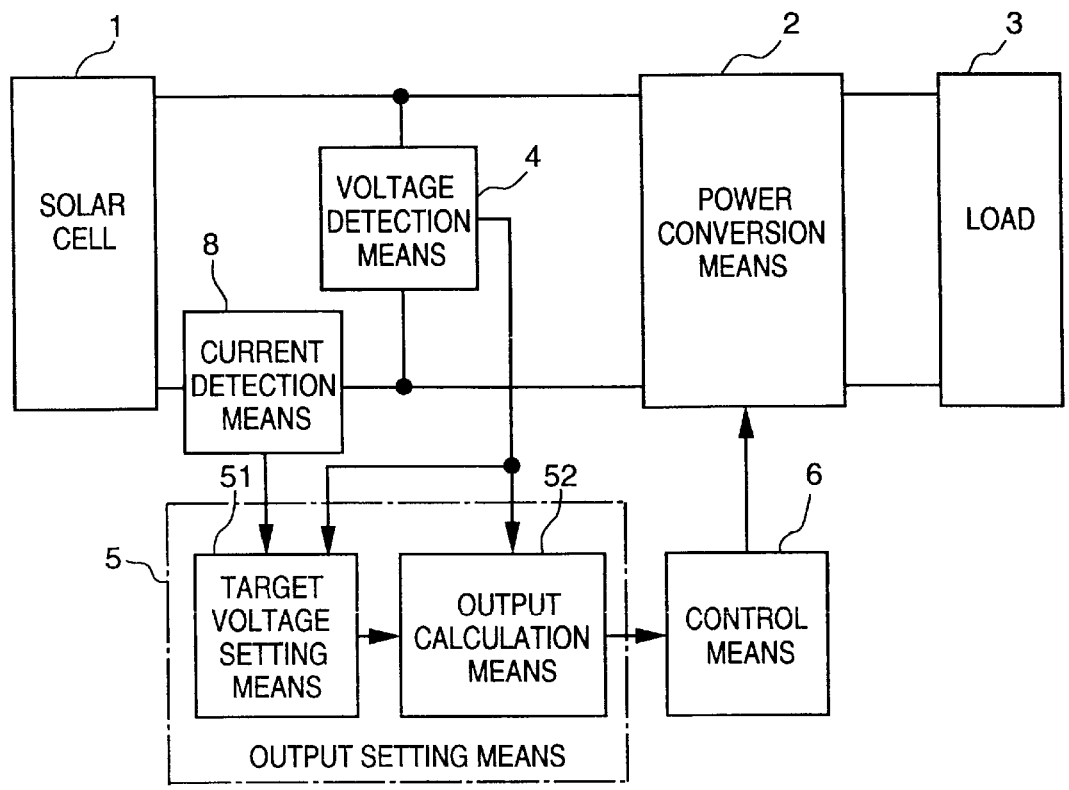

As shown in FIG. 15, 10 amorphous silicon solar cell modules (available from USSC Corp., trade name: UPM-880) are connected in series with each other as the solar cell 1, and a full-bridge inverter using an IGET (Insulated Gate Bipolar Transistor) as a self-extinction type switching element is constituted as the power conversion means 2. The IGBT is a high-withstand voltage, high-speed switching element, and is preferably used in inverters of several hundred W to several ten kW classes.

In this embodiment, the AC output from the power conversion means 2 is transformed to 100 [V] using a transformer, and is connected to an commercial AC system as the load 3.

On the other hand, the voltage detection means 4 has an arrangement in which the output voltage from the solar cell array is voltage-divided to 20:1, the voltage value is converted into a digital value using a 10 V full-scale, 12-bit A/D converter, and the digital value is output to the output setting means 5 via an 8-bit parallel bus.

The current detection means 8 has an arrangement in which a standard resistor of 10 mΩ is inserted in series with the solar cell array circuit, a voltage across the two terminals of the resistor is amplified to 500 times using an operational amplifier, the amplified voltage value is converted into a 12-bit digital value using the same A/D converter as in the voltage detection means 4, and the digital value is output to the output setting means 5 via an 8-bit parallel bus.

As the output setting means 5, a one-board microcomputer (8086, available from Intel Corp.) is used. This board comprises versatile parallel input/output ports, a memory, a numeric coprocessor, a serial interface, and the like, i.e., has an arrangement suitable for the embodiment of the present invention. The control means 6 uses PWM (pulse width modulation) based on a known triangular wave comparison method, and its carrier frequency is set to be 2 [kHz]. The control means 6 changes the duty (ON time/(ON time+OFF time) of gate pulses so that the command voltage from the output setting means 5 matches the output voltage from the solar cell array.

Figure 16:
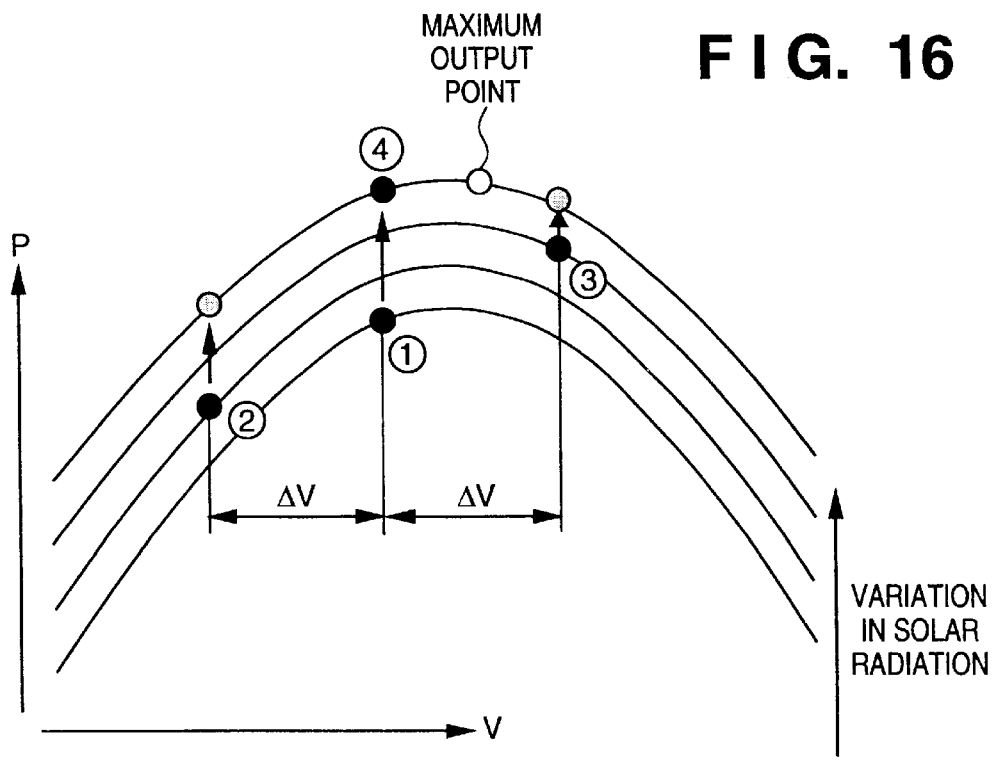
Figure 17:
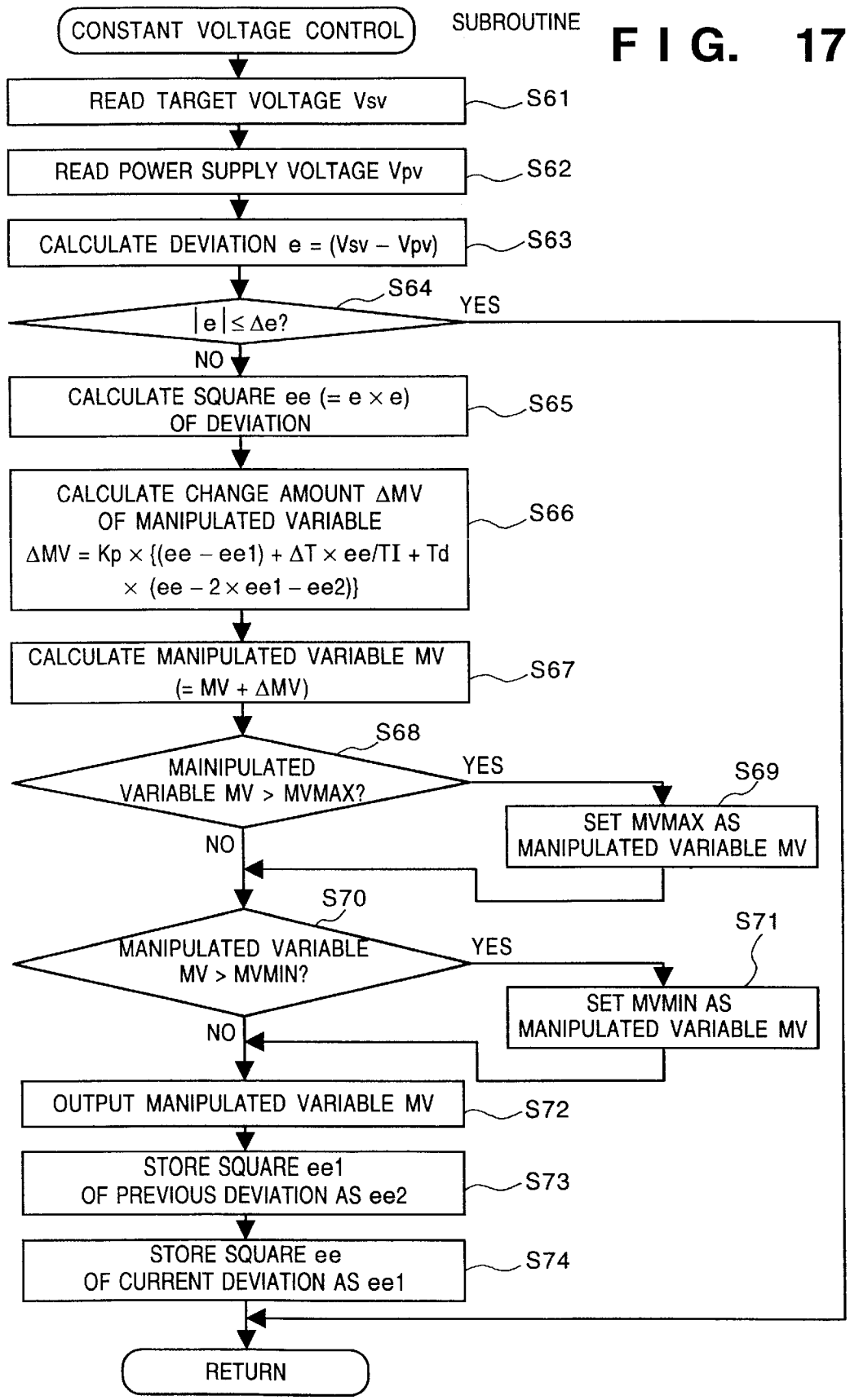
Figure 18:
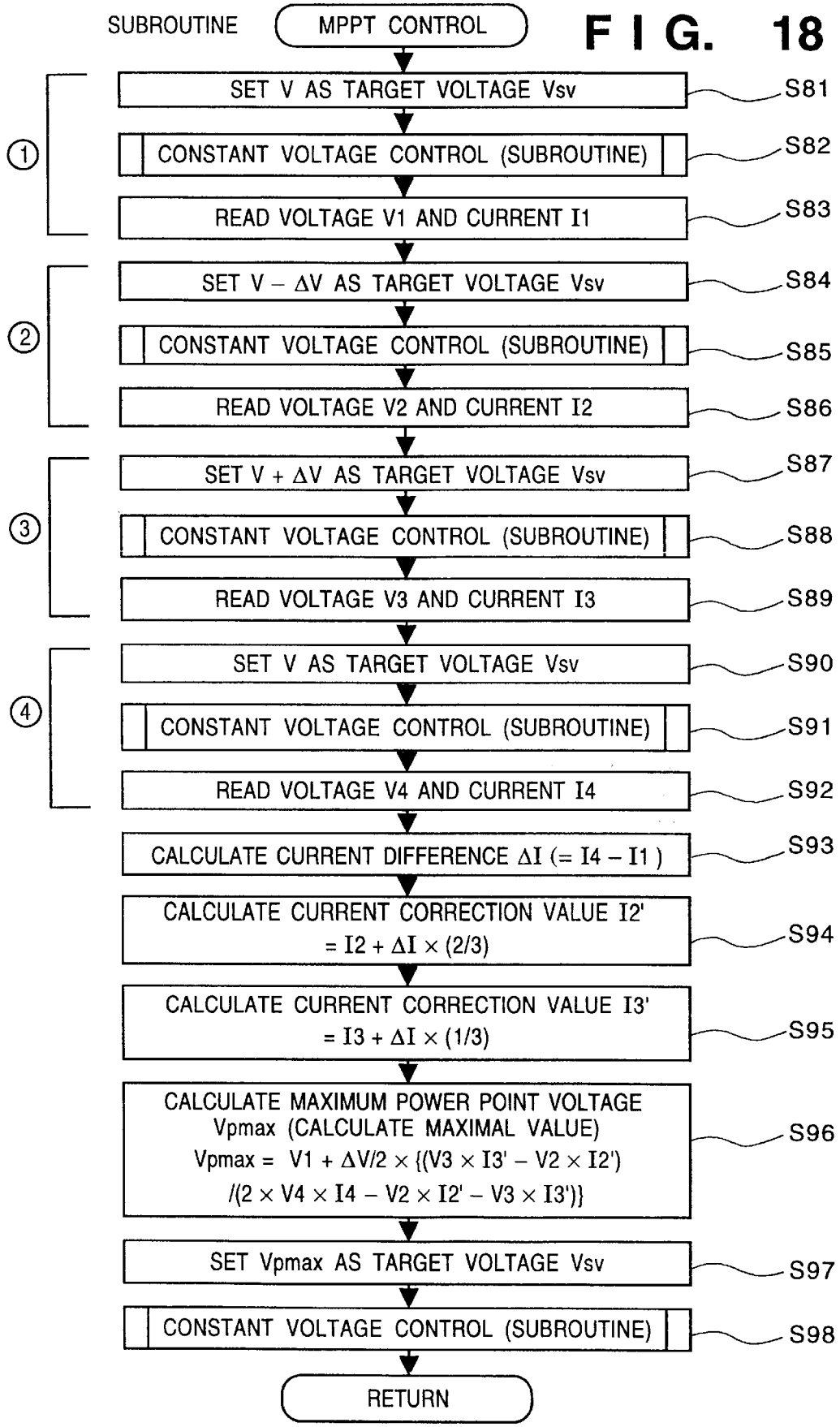

In this arrangement, the MPPT control of the solar cell is performed using the voltage control method of the present invention and a power control method described in Japanese Patent Application No. 6-224962. In this power control method, as shown in FIG. 16, sampling is performed at four points ① to ④, and the final sampling voltage ((①)) is set to equal the first sampling voltage ((①)), thereby eliminating the influence of variations in solar radiation amount on the respective sampling points. FIGS. 12, 17, and 18 are flow charts showing the control of this embodiment. FIG. 12 shows the control method described in the second embodiment. FIG. 17 shows the constant voltage control routine as the subroutine of the MPPT control routine shown in FIG. 18. In steps S61 and S62, a target voltage Vsv and a power supply voltage Vpv are read. In step S63, a deviation e is calculated. Subsequently, it is checked in step S64 if the deviation e falls within the constant voltage precision range of ±Δe. If YES in step S64, the flow ends; otherwise, the square, ee, of the deviation e is calculated (step S65). In step S66, a change amount ΔMV of the manipulated variable is calculated on the basis of the values calculated in the above steps. In step S67, the sum of the previous manipulated variable and the change amount is calculated to obtain the current manipulated variable MV. In step S68, it is checked if the current manipulated variable MV is larger than the maximum manipulated variable MVMAX. If YES in step S68, the maximum manipulated variable MVMAX is set to be the current manipulated variable MV (step S69). On the other hand, if NO in step S68, it is checked if the current manipulated variable is larger than the minimum manipulated variable MVMIN (step S70). If YES in step S70, the minimum manipulated variable MVMIN is set to be current manipulated variable Mv (step S71). Furthermore, if NO in step S70, the manipulated variable MV calculated in step S67 is output (step S72). In step S73, the square, ee1, of the previous deviation is stored as ee2. In step S74, the square, ee, of the current deviation is stored as ee1. Thereafter, the flow returns to the MPPT control routine.

In the MPPT routine, as shown in FIG. 18, V is set to be the target voltage ((①)) in step S81. In step S82, the constant voltage control routine shown in FIG. 17 is executed. In step S83, the target voltage setting means 51 reads a voltage value V1 and a current value I1 from the voltage detection means 4 and the current detection means 8, respectively. In step S84, V−ΔV is set to be the target voltage ((②)). Subsequently, in step S85, the constant voltage control routine shown in FIG. 17 is executed. Then, a voltage value V2 and a current value I2 are read in step S86. In step S87, V+ΔV is set to be the target voltage (③). In step S88, the constant voltage control routine shown in FIG. 17 is executed. In step S89, a voltage value V3 and a current value I3 are read. Furthermore, in step S90, V is set to be the target voltage (④). In step S91, the constant voltage control routine shown in FIG. 17 is executed. In step S92, a voltage value V4 and a current value I4 are read. In step S93, the current difference between the current values I4 and I1 is calculated. In steps S94 and S95, current correction values I2' and I3' are calculated. A voltage value Vpmax at the maximum power point is calculated based on the values calculated in the above-mentioned steps (step S96), and the calculated voltage value is set to be the target voltage value (step S97). The constant voltage control is executed again, and the flow returns to the main program.

The solar cell array 1 is equipped outdoors, and the output setting means 5 sets 150 [V] to be the target voltage. At this time, the array output from the solar cell 1 is assume to be a voltage of 150 [V], a current of 0.807 [A], and electric power of 121.1 [W], and the solar radiation amount is assumed to be about 75 mW/cm². These initial values can be arbitrarily selected depending on the array arrangement of the solar cell 1 that matches the input/output voltage of the power conversion means, and the type of solar cell used.

The output setting means 5 sets the magnitude of the sine waveform of the AC output. As the PID control formula used for setting the magnitude of the sine waveform, equation (2) above is used. In equation (2), equation (3) is applied to all the proportional, integral, and derivative terms. In this case, equation (2) is replaced by equation (5) below:

$$MV_n = MV_{n-1} + K_P' \left\{ \left( e_n|e_n| - e_{n-1}|e_{n-1}| + \frac{\Delta t}{T_I} e_n|e_n| + \frac{T_D}{\Delta t} (e_n|e_n| - 2e_{n-1}|e_{n-1}| + e_{n-2}|e_{n-2}|) \right) \right\}$$ (5)

Note that the respective parameters are set to be Δt=0.2, $K_P'$=−0.05, $T_I$=0.12, and $T_D$=0.2. The target voltage setting means 52 changes the output voltage from the solar cell 1 at four points (150 [V] (①), 145 [V] (②), 155 [V] (③), and 150 [V] (④)) separated by 5-V intervals. Table 2 below summarizes the current values obtained in correspondence with these voltages, the current values subjected to correction of variations in solar radiation amount under the MPPT control used in this embodiment, and the electric power values.

TABLE 2

| | First Measured Current [A] | Second Measured Current [A] | Corrected Current [A] | Electric Power [W] |
|---|---|---|---|---|
| 145 V | ② 0.863 | . . . | 0.923 | 133.8 |
| 150 V | ① 0.807 | ④ 0.897 | 0.897 | 134.5 |
| 155 V | ③ 0.837 | . . . | 0.867 | 134.4 |

Figure 19:
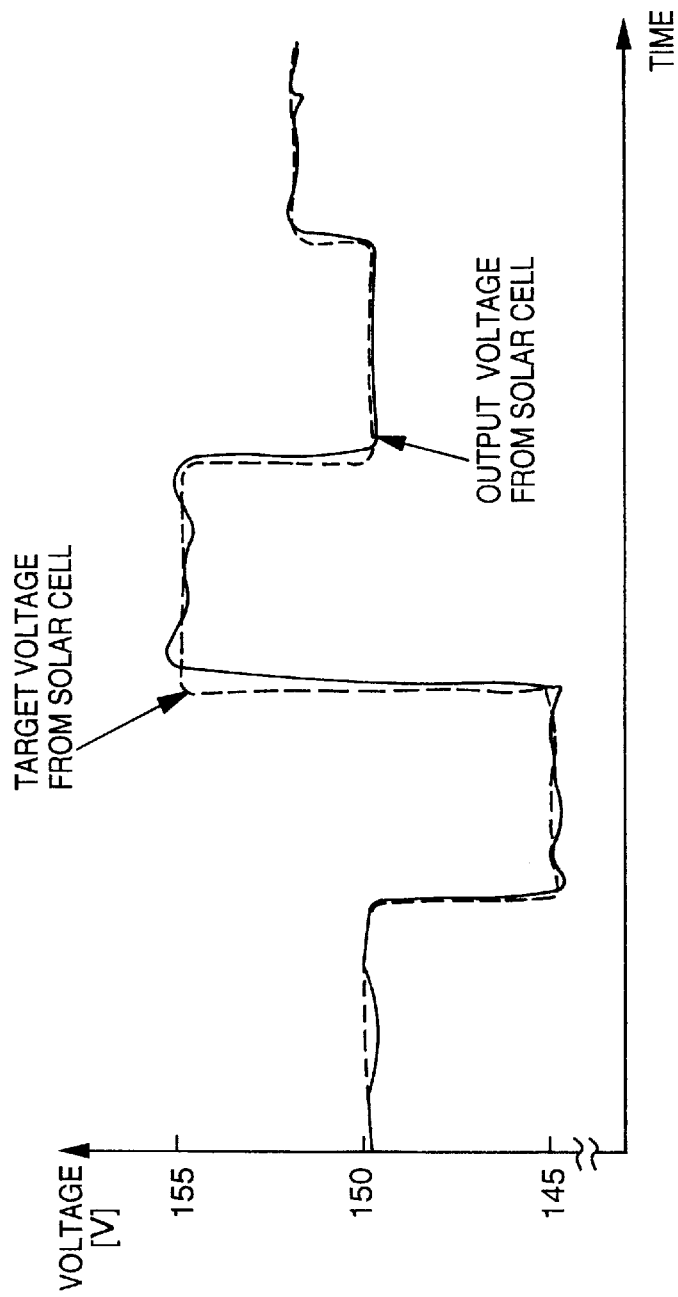

These set voltages, and output currents and output electric powers obtained in correspondence with these voltages are stored in a memory of the one-board microcomputer, and are approximated by a quadratic curve to obtain a maximum point of the curve. In this embodiment, the voltage at the maximum point is V=151.9 [V]. In this manner, the output voltage setting value is determined, and a voltage is output to the control means 6. FIG. 19 shows changes in solar cell output voltage at that time. As can be seen from FIG. 19, since the optimum operation voltage measured by an I–V tracer immediately before confirmation of the operation of this embodiment was about 152.0 [V], an operation at an optimum operation voltage due to the synergetic effect of the voltage control method of the present invention and the control method of Japanese Patent Application No. 6-224962 is confirmed.

As described above, according to the present invention, since a deviation is estimated using its n-th power in feedback voltage control, the following effects are expected.

(1) Even when the solar radiation amount abruptly changes, and the voltage from the solar cell abruptly changes, since such changes in voltage are estimated using the n-th power of the deviation, i.e., with larger weights than those in the conventional apparatus, a large manipulated variable can be set, and voltage control that can eliminate the influence of variations in solar radiation amount can be attained.

(2) Even when the measured voltage slightly varies due to the influence of noise, since such variations are estimated using the n-th power of the deviation, i.e., with smaller weights than those in the conventional apparatus, a small manipulated variable can be set, and voltage control strong against noise can be attained.

(3) Even when the setting voltage is changed, it can be tracked satisfactorily.

(4) In the PID control, since a derivative term that determines a manipulated variable in proportion to the differential value of the n-th power of the deviation is added, a future change amount can be predicted, and the control of the present invention is effective for digital control that processes discrete data. Also, the control of the present invention is particularly effective for a slow-response load such as a pump, motor, or the like.

(5) When an appropriate operation voltage is set as the setting voltage, electric power can be efficiently obtained. Especially, in the case of an amorphous solar cell, electric power can be obtained more efficiently than a crystalline silicon solar cell.

Note that the present invention is not limited to the above-mentioned description and embodiments, and appropriate modifications and combinations may be made within the scope of the invention.

What is claimed is:

1. A voltage control apparatus comprising:

voltage detection means for detecting a voltage value of a battery power supply;

power conversion means for performing predetermined conversion of electric power supplied from said battery power supply, and supplying the converted electric power to a load or a commercial AC system;

output setting means for setting an output value of said power conversion means on the basis of the voltage detection value; and control means for controlling said power conversion means on the basis of the output setting value, wherein said output setting means comprises target voltage setting means for setting a target voltage value of said battery power supply, output calculation means for calculating the output setting value on the basis of a deviation between the voltage detection value and the target voltage value, proportional adjustment means for adjusting the output setting value in proportion to the m-th power of the deviation, and integral adjustment means for adjusting the output setting value in proportion to an integral value of the m-th power of the deviation.

2. The apparatus according to claim 1, wherein said output setting means comprises derivative adjustment means for adjusting the output setting value in proportion to a differential value of the n-th power of the deviation.

3. The apparatus according to claim 2, wherein n=2.

4. The apparatus according to claim 1, wherein m=1 or 2.

5. The apparatus according to claim 1, wherein said battery power supply comprises a solar cell.

6. The apparatus according to claim 5, wherein said solar cell comprises an amorphous solar cell.

7. A battery power supply voltage control method for controlling a voltage of a battery power supply in an apparatus which comprises said battery power supply, and power conversion means for performing predetermined conversion of electric power supplied from said battery power supply, and supplying the converted electric power to a load or a commercial AC system, and controls said power conversion means on the basis of a voltage value of said battery power supply, comprising the steps of:

sampling a voltage value of said battery power supply;

setting a target voltage value of said battery power supply;

calculating a deviation between the sampled voltage value and the set target voltage value;

calculating a proportional term proportional to the m-th power of the deviation;

calculating an integral term proportional to an integral value of the m-th power of the deviation;

calculating a derivative term proportional to a differential value of the n-th power of the deviation;

calculating an output setting value of said power conversion means on the basis of a sum of the proportional, integral, and derivative terms; and controlling a voltage of said battery power supply by controlling said power conversion means in accordance with the output setting value.

8. The method according to claim 4, wherein n=2.

9. The method according to claim 7, wherein said battery power supply comprises a solar cell.

10. The method according to claim 9, wherein said solar cell comprises an amorphous solar cell.

11. A battery power supply voltage control method for controlling a voltage of a battery power supply in an apparatus which comprises said battery power supply, and power conversion means for performing predetermined conversion of electric power supplied from said battery power supply, and supplying the converted electric power to a load or a commercial AC system, and controls said power conversion means on the basis of a voltage value of said battery power supply, comprising the steps of:

sampling a voltage value of said battery power supply;

setting a target voltage value of said battery power supply;

calculating a deviation between the sampled voltage value and the set target voltage value;

calculating a change amount of an output setting value of said power conversion means on the basis of m-th power values and n-th power values of k deviations;

calculating a current output setting value of said power conversion means by adding a previous output setting value of said power conversion means and the change amount of the output setting value; and controlling a voltage of said battery power supply by controlling said power conversion means in accordance with the calculated current output setting value.

12. The method according to claim 11, wherein k=3.

13. The method according to claim 12, wherein the three deviations are calculated from three successively sampled voltage values.

14. The method according to claim 11, wherein said battery power supply comprises a solar cell.

15. The method according to claim 14, wherein said solar cell comprises an amorphous solar cell.

16. The method according to claim 7 or 11, wherein m=1 or 2.

17. A voltage control apparatus comprising:

voltage detection means for detecting a voltage value of a battery power supply;

power conversion means for performing predetermined conversion of electric power supplied from said battery power supply, and supplying the converted electric power to a load or a commercial AC system;

output setting means for setting an output value of said power conversion means on the basis of the voltage detection value; and control means for controlling said power conversion means on the basis of the output setting value, wherein said output setting means comprises target voltage setting means for setting a target voltage value of said battery power supply, output calculation means for calculating the output setting value on the basis of a deviation between the voltage detection value and the target voltage value, and derivative adjustment means for adjusting the output setting value in proportion to a differential value of the n-th power of the deviation.

18. The apparatus according to claim 17, wherein n=2.

19. The apparatus according to claim 17, wherein said battery power supply comprises a solar cell.

20. The apparatus according to claim 19, wherein said solar cell comprises an amorphous solar cell.

21. A battery power supply voltage control method for controlling a voltage of a battery power supply in an apparatus which comprises said battery power supply, and power conversion means for performing predetermined conversion of electric power supplied from said battery power supply, and supplying the converted electric power to a load or a commercial AC system, and controls said power conversion means on the basis of a voltage value of said battery power supply, comprising the steps of:

sampling a voltage value of said battery power supply;

setting a target voltage value of said battery power supply;

calculating a deviation between the sampled voltage value and the set target voltage value;

calculating a proportional term proportional to the m-th power of the deviation;

calculating an integral term proportional to an integral value of the m-th power of the deviation;

calculating an output setting value of said power conversion means on the basis of a sum of the proportional and integral terms; and controlling a voltage of said battery power supply by controlling said power conversion means in accordance with the output setting value.

* * * * *

UNITED STATES PATENT AND TRADEMARK OFFICE
CERTIFICATE OF CORRECTION

PATENT NO. : 5,892,354
DATED : April 6, 1999
INVENTOR(S): YOSHITAKA NAGAO, ET AL.

It is certified that error appears in the above-identified patent and that said Letters Patent is hereby corrected as shown below:

COLUMN 1

Line 14, "expected" should read --expected to be--.

COLUMN 4

Line 51, "circuit 5," should read --circuit,--; and
    Line 55, "PAM," should read --RAM,--.

COLUMN 6

Line 60, "$T_D$'0.08." should read --$T_D$'=0.08.--

COLUMN 7

Line 24, "+$\Delta$e" should read --±$\Delta$e--; and
    Line 32, "$e_{n-1}$,/" should read --$e_{n-1}$,--.

UNITED STATES PATENT AND TRADEMARK OFFICE
CERTIFICATE OF CORRECTION

PATENT NO. : 5,892,354

DATED : April 6, 1999

INVENTOR(S): YOSHITAKA NAGAO, ET AL.

Page 2 of 3

It is certified that error appears in the above-identified patent and that said Letters Patent is hereby corrected as shown below:

COLUMN 8

Line 61, "(I" should read --③--.

COLUMN 9

Line 4, "②" should read --③--;
Line 52, "IGET" should read --IGBT--; and
Line 60, "an" should read --a--.

COLUMN 10

Line 18, "time)" should read --time))--;
Line 26, "voltage (①))" should read --voltage (④))--; and
Line 53, "variable Mv" should read --variable MV--.

UNITED STATES PATENT AND TRADEMARK OFFICE
CERTIFICATE OF CORRECTION

PATENT NO. : 5,892,354

DATED : April 6, 1999

INVENTOR(S): YOSHITAKA NAGAO, ET AL.

It is certified that error appears in the above-identified patent and that said Letters Patent is hereby corrected as shown below:

COLUMN 11

Line 18, "assume" should read --assumed--; and
Line 39, "$K_p$'+-0.05," should read --$K_p$'=-0.05,--.

Signed and Sealed this

Fourth Day of January, 2000

Attest:

Attesting Officer

Acting Commissioner of Patents and Trademarks